United States Patent [19]

Smith

[11] Patent Number: 5,917,325
[45] Date of Patent: Jun. 29, 1999

[54] METHOD FOR LOCATING AN INACCESSIBLE OBJECT HAVING A MAGNETIC FIELD GENERATING SOLENOID

[75] Inventor: Royston Smith, Bristol, United Kingdom

[73] Assignee: Radiodetection Limited, Bristol, United Kingdom

[21] Appl. No.: 08/894,664

[22] PCT Filed: Mar. 19, 1996

[86] PCT No.: PCT/GB96/00660

§ 371 Date: Aug. 25, 1997

§ 102(e) Date: Aug. 25, 1997

[87] PCT Pub. No.: WO96/29615

PCT Pub. Date: Sep. 26, 1996

[30] Foreign Application Priority Data

Mar. 21, 1995 [GB] United Kingdom ................. 9505652

[51] Int. Cl.$^6$ .............................. G01V 3/08; G01V 3/165
[52] U.S. Cl. ..................... 324/326; 175/45; 324/207.26; 324/244
[58] Field of Search ................... 324/326–329, 324/345, 346, 207.17, 207.26, 247; 175/26, 45, 61, 62

[56] References Cited

U.S. PATENT DOCUMENTS

| | | | |
|---|---|---|---|
| 4,710,708 | 12/1987 | Rorden et al. | 324/207.26 |
| 4,875,014 | 10/1989 | Roberts et al. | 324/346 X |
| 5,155,442 | 10/1992 | Mercer . | |
| 5,621,325 | 4/1997 | Draper et al. | 324/326 |
| 5,633,589 | 5/1997 | Mercer | 324/326 |

FOREIGN PATENT DOCUMENTS 417959  3/1991  European Pat. Off. .

*Primary Examiner*—Gerard Strecker
*Attorney, Agent, or Firm*—Woodbridge & Associates

[57] ABSTRACT

In order to locate an inaccessible object, such as an underground boring tool (30), a solenoid (10) on or in the tool generates a magnetic field which is detected at two measuring locations (20, 21). Information relating to the relationship between the axial and radial components of the field from the solenoid (10) are stored, and comparison of the measured values of the axial and radial components at the measurement locations (20, 21) enables the direction of the solenoid (10) from the measurement locations (20, 21) to be determined. The known attenuation of the magnetic field from the solenoid (10) enables the distance between the solenoid (10) and the measurement locations to be determined from the absolute value of the field at the measurement locations (20, 21) and the direction to the solenoid (10). The present invention thus makes use of the fact that there is a known relationship between the axial and radial fields of the solenoid (10) at any point in the plane containing the solenoid and the line joining the measurement location to the solenoid. A tilt sensor may be provided to indicate if the axis of the solenoid is not horizontal, to enable axial radial directions to be determined.

12 Claims, 5 Drawing Sheets

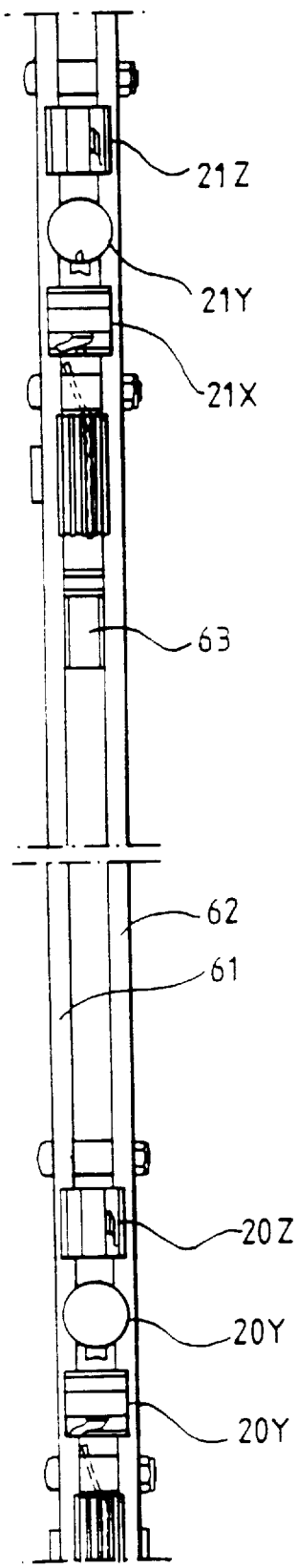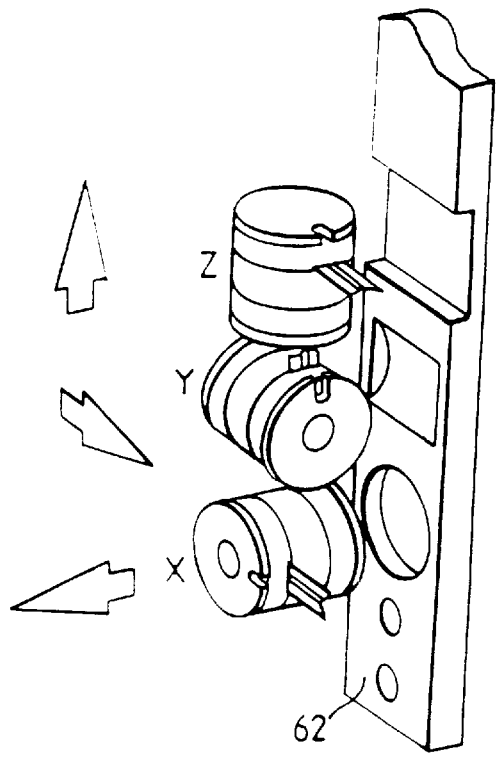
Fig.6.
Fig.7.

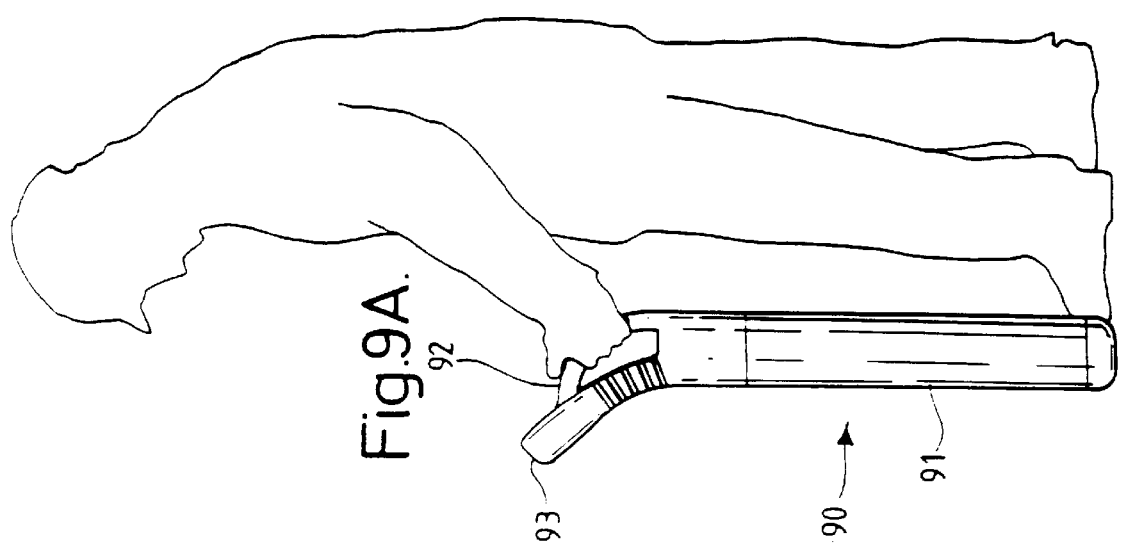
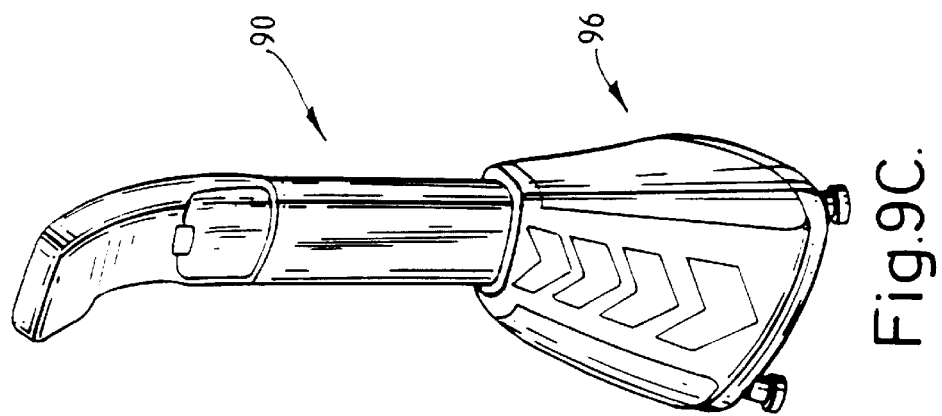
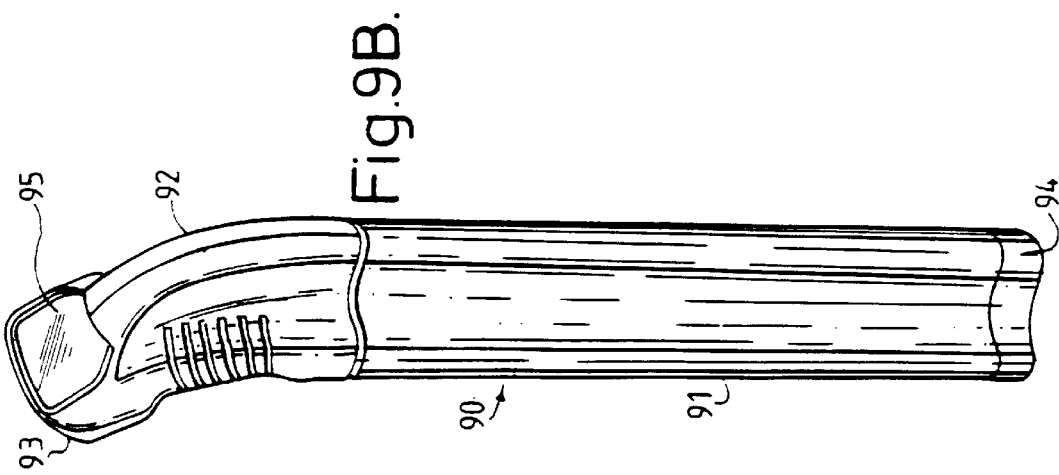

METHOD FOR LOCATING AN INACCESSIBLE OBJECT HAVING A MAGNETIC FIELD GENERATING SOLENOID

BACKGROUND OF THE INVENTION

1. Field of the Invention

The present invention relates to a method for locating inaccessible objects, particularly, but not exclusively, for locating underground boring tools.

2. Summary of the Prior Art

When locating underground objects it is known to arrange for a magnetic field to be generated by the object or by a field source attached thereto. In the case of underground conductors such as cables or pipes, an alternating current can be applied to the conductor to induce a cylindrical magnetic field with a detectable field strength at ground level. By measuring the variation of the field strength at the surface, the path of the underground conductor can be determined.

The locating of objects such as sub-surface boring tools cannot normally be performed in this way because a cylindrical field cannot be generated. Instead a magnetic field source is mounted on the boring tool and the field from that field source is detected. This field source can be a solenoid. When alternating current flows through the solenoid a bipolar magnetic field is generated which can be located at the surface by a person with a hand-held detector. The vertical component of the field at the surface will change direction when the field detector is directly above the solenoid. Therefore by noting the position in which that component of the field reverses the position of the solenoid in a horizontal plane can be determined. If this is done continuously, the movement of the boring tool on which the solenoid is mounted can be tracked. The depth of the solenoid can also be gauged by measuring the attenuation of the field at the surface. Of course, this requires the field strength at the solenoid to be known.

The method described above for locating a solenoid is a method of trial-and-error. The field detector must be maneuvered into the correct position, namely directly above the solenoid, for the solenoid to be accurately located. When the field detector is anywhere other than directly above the solenoid, the location of the solenoid is not known. This is inconvenient, especially if the solenoid is underneath a road or a waterway.

SUMMARY OF THE PRESENT INVENTION

The present invention proposes a method of locating a solenoid carrying an alternating electric current by detecting the magnetic field generated by the solenoid at a remote site, so that the need for detecting the field from directly above the solenoid is eliminated. The solenoid may be mounted on a sub-surface boring tool, which can then be controlled as required according to its measured location.

The present invention makes use of the realization that there is a known relationship between the ratio of the axial and radial magnetic fields at any point in the plane containing the axis of the solenoid and the angle between the axis of the solenoid and the line joining the point to the center of the solenoid. Therefore, the present invention proposes that information corresponding to that relationship be stored, e.g. in a computer, so that measurement of the axial and radial fields enable the angle to be determined, thereby to enable the direction from the measuring point to the solenoid to be determined.

Since the invention must determine the axial and radial fields, to enable the angle to be determined, it is necessary to know the orientation of the solenoid. If it is possible to maintain the solenoid in a predetermined orientation, then there is no difficulty. However, if the solenoid is mounted in an object which moves underground, such as a boring tool, its orientation may change. To compensate for this the boring tool may then incorporate a tilt sensor which permits the orientation of the solenoid relative to the horizontal to be determined, thus determining the direction of the axial and radial fields that must be determined. Normally, those axial and radial fields will be measured directly, but it is possible to measure e.g. horizontal and vertical components, and then calculate the axial and radial fields.

Preferably, the absolute value of the field strength at the measuring point is also measured. The field strength at the solenoid itself will in general be known so that the attenuation of the field at the measuring point can be used to calculate the distance of the measuring point from the solenoid. The position of the solenoid with respect to the measuring point is then derived from the values of the distance between them and the angle formed by the line joining them and the axis of the solenoid.

Similar measurements may be performed at a second and subsequent measuring points at known separation from the first measuring point. The results from the different measuring points may be averaged once the separation and any angle between the line joining the measuring points and the radial direction has been taken into account to increase the reliability of the measurements and to reduce the effects of noise.

As mentioned above, if the solenoid is mounted on a boring tool, it is likely that, during the course of drilling, changes in the soil conditions or operator action will cause the boring tool to climb or dive, thus changing the orientation of the solenoid. Additionally, the receiver may be portable and may have a degree of tilt imposed on it when it is moved between its operating positions. To counter this problem, tilt sensors may be mounted on the drill head and/or the receiver to measure any deviation as mentioned above. An example of such a tilt sensor device is depicted in FIG. 3 as item 32. The data received by the receiver may then be mathematically rotated e.g. by the system computer to compensate for this change in orientation, so that the drill head may still be guided accurately.

Normally, the measuring point(s) are positioned in the vertical plane through the axis of the solenoid. However, this situation will be disturbed if the drill head deviates in the horizontal plane, that is, to the left or right of the desired direction of travel. This deviation may be detected by measuring, at a point in the vertical plane through the axis of the undeviated solenoid, the component of the field strength in a direction perpendicular to that plane. Having detected this deviation, the drill head may be controlled accordingly.

Normally, the or each measuring point will be defined by one or more antennae in a receiver. A second receiver may thus be provided so that the solenoid comes into range of the second receiver as it passes out of the range of the first, thus increasing the distance over which the solenoid can be located. Subsequent receivers may be provided to increase further the operational range of the system.

BRIEF DESCRIPTION OF THE DRAWINGS

An embodiment of the present invention will now be described, by way of example, with reference to the accompanying drawings, in which:

FIG. 6 shows an example of the structure of a receiver used to detect the magnetic field of the solenoid at one of the measuring points;

FIG. 7 shows part of the receiver of FIG. 6 in more detail;

FIGS. 9A to 9C illustrate the receiver of FIG. 6 in conjunction with a base unit.

DETAILED DESCRIPTION

Figure 1A:
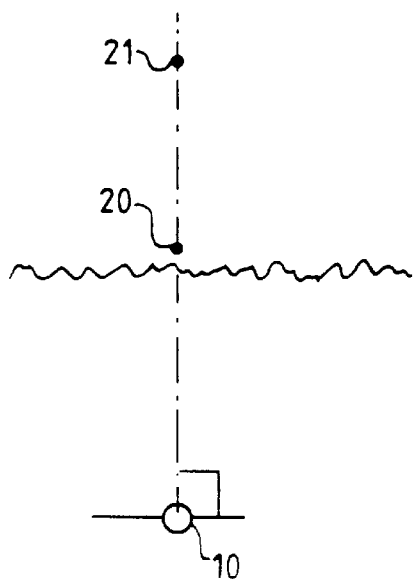
FIG. 1a shows an underground solenoid, viewed along the axis of the solenoid, and first and second measuring points.
Figure 1B:
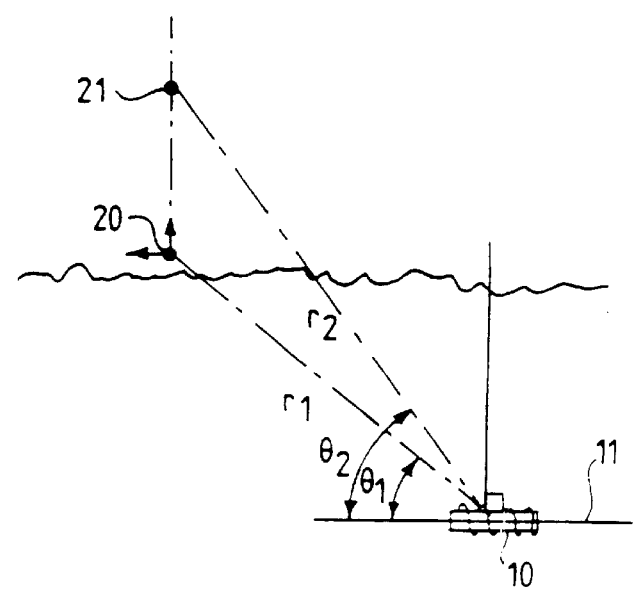
FIG. 1b is a side view of the same solenoid and measuring points.

FIGS. 1a and 1b show a solenoid 10 buried underground. An alternating electric current whose magnitude is known is passed through the coils of the solenoid 10. The flow of electric current through the solenoid 10 generates a magnetic field. The magnetic field strength at the solenoid 10 itself can be measured before the solenoid 10 is buried. The solenoid 10 is arranged so that its axis 11 is horizontal. Also shown is a first measuring point 20 and a second measuring point 21 at which magnetic field measurements are made. These measuring points 20,21 lie in the vertical plane containing the axis 11 of the solenoid 10. The measuring points 20,21 lie directly one above the other at a known vertical separation. The location of the first measuring point 20 relative to the solenoid 10 can be defined by a distance $r_1$ between them and the angle $\theta_1$ above, the horizontal of the solenoid 10 to the first measuring point 20. The relative positions of the second measuring point 21 and the solenoid are similarly defined by distance $r_2$ and angle $\theta_2$.

The horizontal component $f_h$ and the vertical component $f_v$ of the field strength are measured at the first measuring point 20, and the ratio $f_h/f_v$ is calculated by a system computer (not shown). The ratio $f_h/f_v$ is a function of angle $\theta_1$, and this function can be determined analytically and stored in the memory of the system computer. The function is shown graphically in FIG. 2. It can be seen from FIG. 2 that the function is monotonic, that is, each value of the ratio $f_h/f_v$ corresponds to one and only one value of angle $\theta_1$. Therefore when the calculated value of the ratio $f_h/f_v$ is input to the computer, the value of $\theta_1$ can be derived.

Similar measurements taken at the second measurement point 21 enable angle $\theta_2$ to be derived in the same way. Once these angles have been determined the distance between the solenoid 10 and the measuring points 20,21 could be derived by triangulation. Instead the absolute values of the field strength at the measuring points 20,21 are measured, and since the field strength at the solenoid itself is known this gives the attenuation of the field at the measuring points 20,21. From the attenuation of the field, the distances $r_1,r_2$ between the solenoid and the measuring points 20,21 can be calculated by the system computer. The attenuation varies both with the distances between the measuring points and the solenoid, and also the angles $\theta_1$ and $\theta_2$. However the angles $\theta_1$ and $\theta_2$ are known, and therefore the attenuation can be determined using e.g. a look-up table which relates attenuation and angle. Once the distances $r_1,r_2$ and angles $\theta_1,\theta_2$ have been determined, the position of the solenoid relative to the measuring points 20,21 is now known. By averaging the results from the two measuring points 20,21 reliability can be increased and the effects of noise can be decreased.

In the above analysis the solenoid was horizontal and therefore the horizontal and vertical components $f_h,f_v$ correspond to the axial and radial components of the magnetic field respectively. It is these components which must be determined in the present invention. If the solenoid was not horizontal, then either the axial and radial components could be measured directly, or the vertical and horizontal components measured and then a correction made to determine the axial and radial components.

Figure 3:
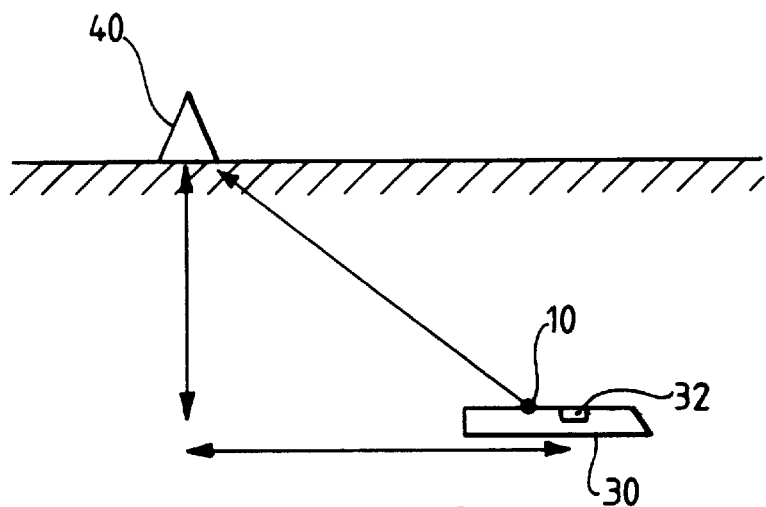
FIG. 3 shows the present invention applied to the location of a sub-surface boring tool.

FIG. 3 shows the application of this principle to locating an underground drill 30. The solenoid 10 is mounted on the drill 30 such that the axis of the solenoid 10 is parallel to the normal motion of the drill 30. In this way, as the drill 30 burrows through the earth, the solenoid 10 moves with the drill 30 and continuous measurements of the type described above track the motion of the drill 30. Receivers (40) are positioned at the two measuring points 20,21. On the basis of the measurements of its position, the drill 30 is controlled using conventional control methods.

Figure 4:
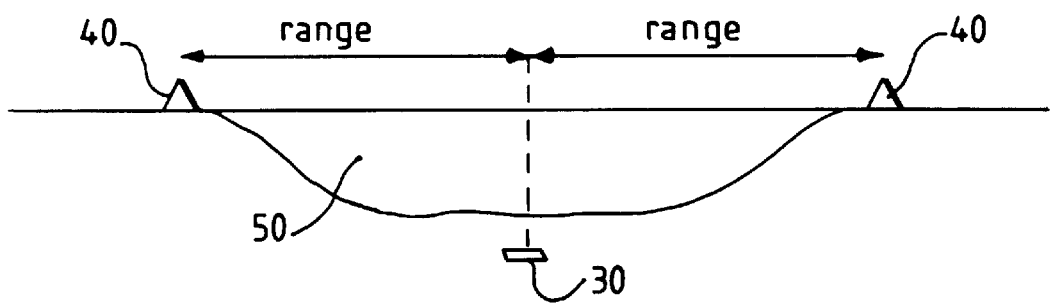
FIG. 4 shows the use of two remote receivers to control a boring tool beneath a waterway.

FIG. 4 shows the case of drilling beneath a river 50 which may well be wider than the horizontal range of the locating system being used to locate the drill. In this case a receiver 40 is stationed on each bank of the river 50. Provided the range of the receivers 40 meet or overlap part way across the river 50, the drill will come into the range of one receiver 40 as, or before, it passes out of the range of the other. In this way the effective distance over which the drill can be located is doubled.

Figure 2:
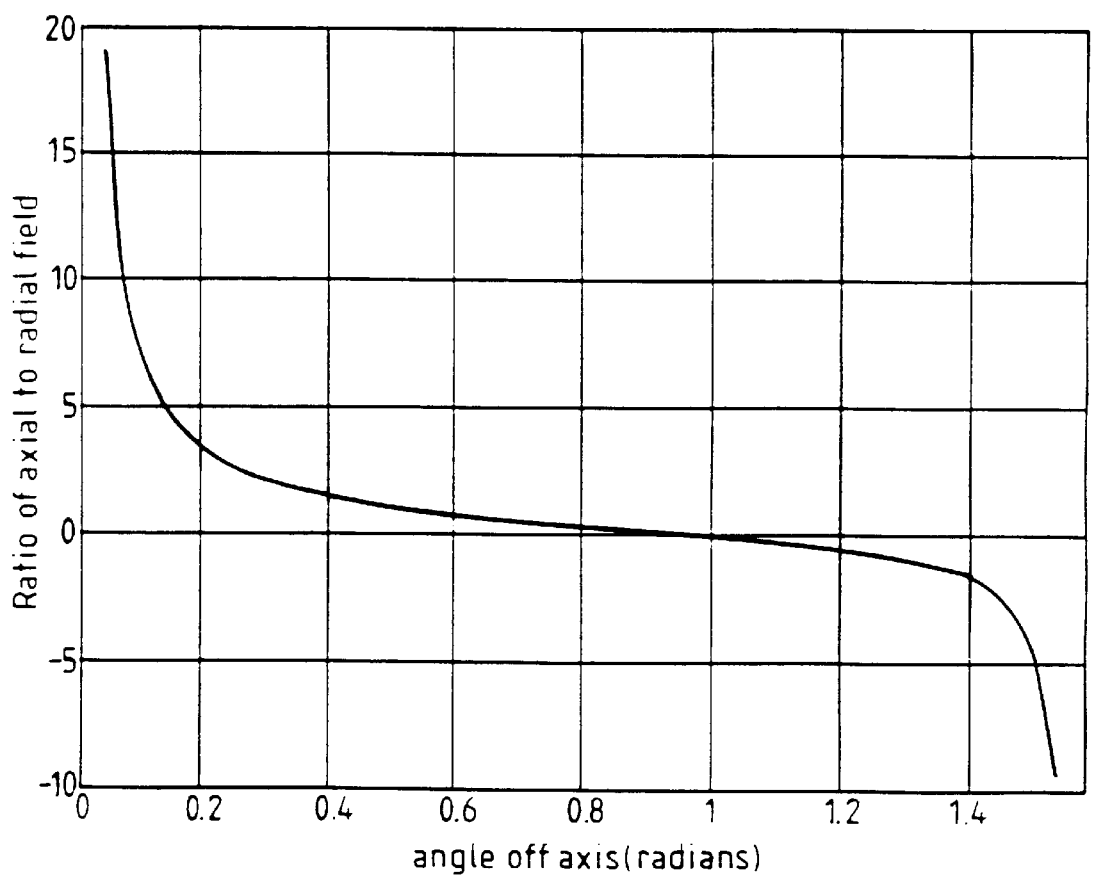
FIG. 2 is a graph showing the ratio of the axial component of the magnetic field at a measuring point to the radial component as a function of the angle between the axis of the solenoid and a line from the measuring point to the center of the solenoid.
Figure 5:
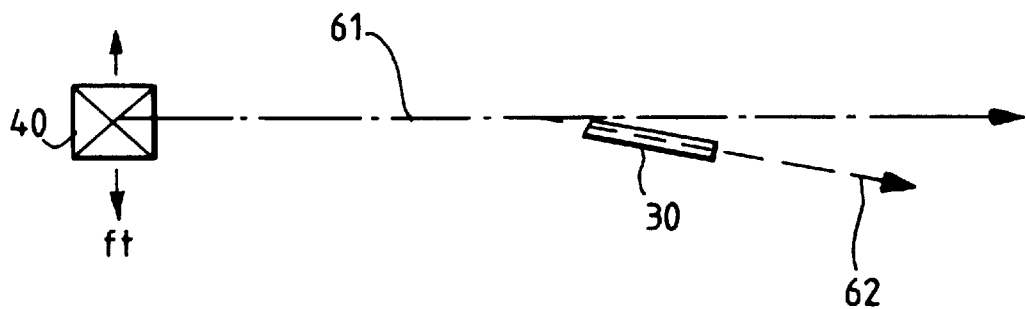
FIG. 5 shows deviation of the boring tool in the horizontal plane.

FIG. 5 is a plan view of the path of an underground drill. Initially the drill follows first path 61. However, the non-uniformity of the earth through which the drill is tunnelling may cause the drill to deviate in the horizontal plane. FIG. 5 shows the case in which the drill is deviated to the right of its initial path so that it then follows second path 62. When this deviation occurs, the vertical plane containing the axis of the solenoid 10 is rotated in the horizontal plane. This means that the receiver 40, and hence the measuring points 20,21, are no longer in this vertical plane. The curve of FIG. 2 is no longer applicable and so the processing of the measured data results in inaccurate drill location. To counter this problem the field component $f_t$ perpendicular to the vertical plane through the desired path of travel of the drill is measured at measuring point 20. The amplitude of this field component is zero if there is no such deviation, and rises as the deviation increases. The phase of this field component relative to the excitation frequency is a function of whether the deviation is to the left or right. Therefore, from the measured amplitude and phase of this field component, the deviation may be measured and the path of the drill head corrected accordingly.

A practical embodiment of a receiver for the invention will now be described in more detail with reference to FIGS. 6 to 9. Each of arrays 20 and 21 comprises three orthogonal coils X, Y and Z, typically with ferrite cores, to sense field components in vertical and two horizontal axes, the corresponding axes coils in 20 and 21 being in alignment with each other. A typical structure for supporting the coils in their correct alignment and separation is depicted in FIG. 6; two parallel rigid sideplates 61 and 62 are clamped around the two coil arrays 20X, 20Y, 20Z and 21X, 21Y and 21Z in the manner shown in FIG. 7. The same vertical structure may also incorporate a tilt sensor, e.g. at 63. The coils and sensor are wired to the receiver electronic circuits, which may be incorporated in a common housing; the signal processing circuitry is shown schematically in FIG. 8.

The field signals detected by each antenna array 80 (equivalent to arrays 20 and 21) are amplified and filtered at stage 81, before entering an A/D converter 82. The resulting digital signal is then fed to a digital signal processing computer 83 which performs the necessary calculations to establish the position of the solenoid relative to the aerial array and averages the results from each array.

Figure 8:
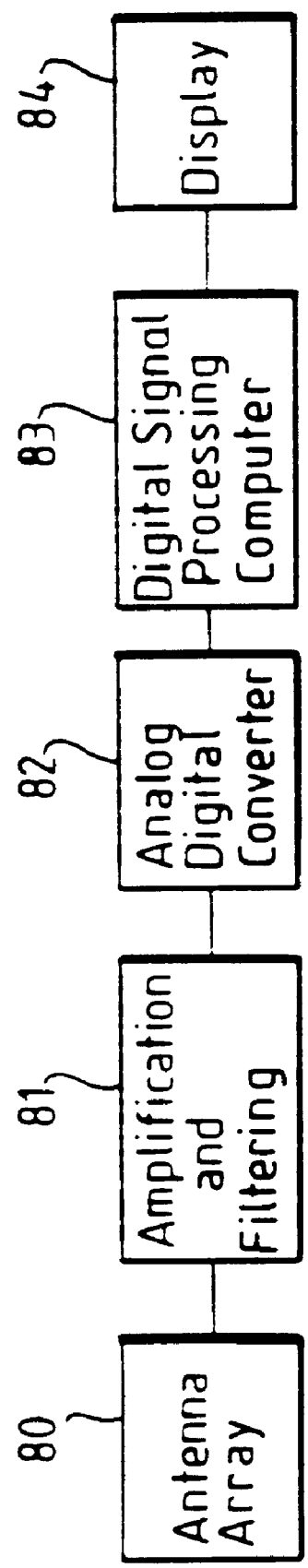
FIG. 8 is a schematic diagram of a signal processing system used in an embodiment of the present invention.

The receiver of FIG. 6, together with the signal processing circuitry of FIG. 8, maybe housed in a handheld unit. Referring to FIG. 9a, such a hand-held unit has a casing 90 with a main part 91 housing the receiver of FIG. 6, a handle 92 and a display part 93. The display part 93 may contain the circuity of FIG. 8.

The housing 90 may be combined with a conventional hand-held locator structure to facilitate preliminary location of the boring tool. The preliminary location, the locator utilizes the arrays 20 and 21 to detect and locate using techniques already known in this field.

FIG. 9B shows the structure of the unit 90 in more detail. The main part 91 of the unit 90 may be an extrusion, with an injected moulded foot 94 at one end thereof. The display part 93, and the handle 92, are formed by injection moulding. FIG. 9B also shows that the display part 93 has a display screen 95 to permit the operator to receive information.

When the location has been established, the unit 90 can then be dropped into a base housing 96, as shown in FIG. 9C. The base housing is then positioned and aligned as the datum for the on going tracking of the boring tool by means of its solenoid coil 30. As an alternative, the receiver of FIG. 6 can be incorporated in a static housing, to be placed at the datum point for on going tracking of the boring tool.

I claim:

1. A method of locating an inaccessible object, which object has a solenoid (10) for generating a magnetic field, the method comprising:
   a) storing information relating to the relationship between the ratio of the axial and radial components of the magnetic field at a plurality of points in the plane containing the axis of the solenoid (10) and the angle between the axis of the solenoid (10) and the line joining each of the plurality of points to the center of the solenoid (10);
   b) determining the ratio of the axial and radial components of the magnetic field at a measurement location; and
   c) determining the one of the plurality of points which corresponds to the measurement location, on the basis of said information and said ratio of the axial and radial components thereby to determine the location of the object relative to the measurement location.

2. A method according to claim 1, wherein the object has a tilt sensor (32) for determining the orientation of the solenoid (10), thereby to determine the direction of the axial and radial components at the measurement location.

3. A method according to claim 1, wherein the horizontal and vertical components of the magnetic field are measured at the measurement location, and the axial and radial components derived from the horizontal and vertical components.

4. A method according to claim 1, wherein the absolute value of the magnetic field at the measurement location is determined.

5. A method according to claim 4, further including determining the distance between the measuring point and the solenoid (10) using the absolute value of the magnetic field and a known attenuation value for the magnetic field.

6. A method according to claim 1, further including determining the component of the magnetic field at the measuring location in a direction perpendicular to the vertical plane containing the line joining the solenoid (10) and the measurement location.

7. A method of locating an inaccessible object, which object has a solenoid (10) for generating a magnetic field, the method comprising:
   a) storing information relating to the relationship between the ratio of the axial and radial components of the magnetic field at a plurality of points in the plane containing the axis of the solenoid (10) and the angle between the axis of the solenoid (10) and the line joining each of the plurality of points to the center of the solenoid;
   b) determining the ratio of the axial and radial components of the magnetic field at a plurality of measurement locations,
   c) determining each one of the plurality of points which corresponds to said plurality of measurement locations, thereby to determine the location of the object relative to each of the measurement locations; and
   d) comparing the spatial relationship between each of the plurality of points with the spatial relationship between each of said plurality of measurement points.

8. A method according to claim 7, wherein the object has a tilt sensor (32) for determining the orientation of the solenoid, thereby to determine the direction of the axial and radial components at the measurement location.

9. A method according to claim 7, wherein the horizontal and vertical components of the magnetic field are measured at the measurement locations, and the axial and radial components derived from the horizontal and vertical components.

10. A method according to claim 7, wherein the absolute value of the magnetic field at each measurement location is determined.

11. A method according to claim 10, further including determining the distances between each measuring point and the solenoid using the absolute value of the magnetic field at each measuring point and a known attenuation value for the magnetic field.

12. A method according to claim 7, further including determining the component of the magnetic field at each measurement location in a direction perpendicular to the vertical plane containing the line joining the solenoid and each measurement location.

* * * * *